Figure 10:
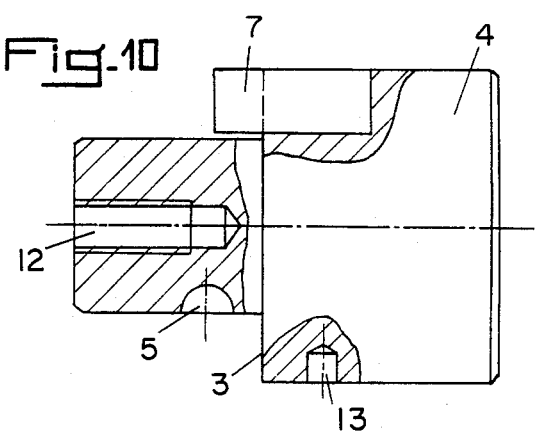
Figure 11:
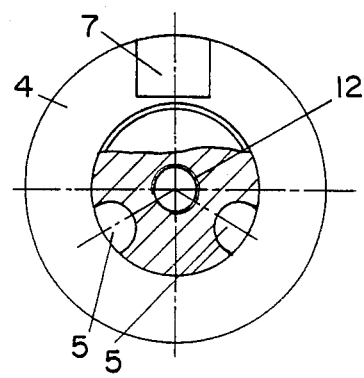
Figure 12:
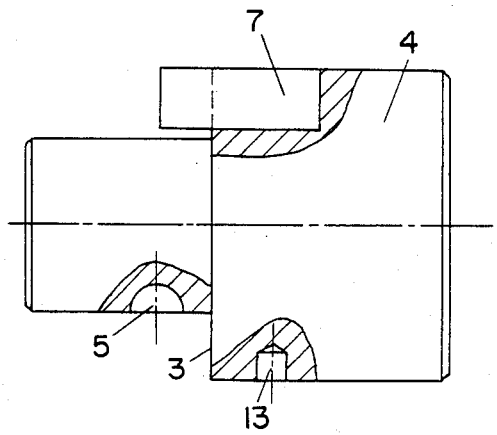
Figure 13:
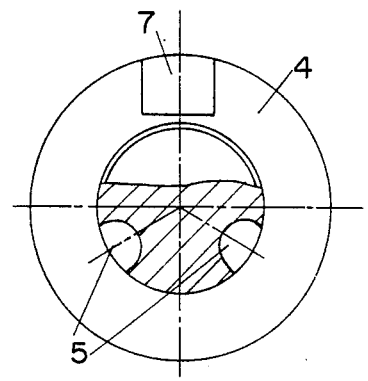
Figure 14:
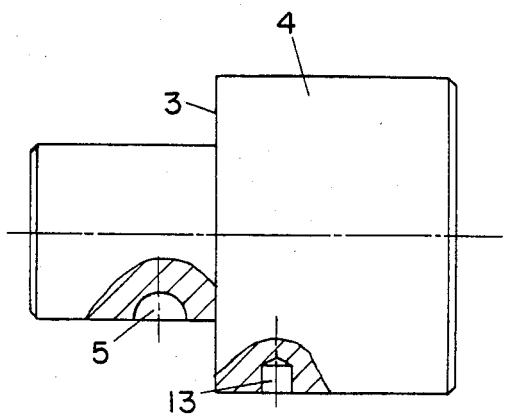
Figure 15:
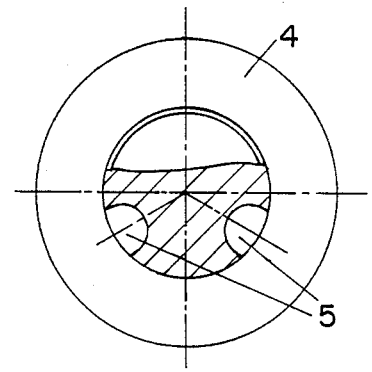

United States Patent [19]

Pfalzgraf

[11] Patent Number: 4,877,360
[45] Date of Patent: Oct. 31, 1989

[54] APPARATUS FOR LOCKING AND/OR GRIPPING MODULAR ATTACHMENTS OF BORING HEADS, BORING BARS, INTERMEDIATE MEMBERS, ADAPTERS, TOOL HOLDERS, HYDRAULIC PUNCHES, LONG TONGS, OR OTHER MECHANICAL MEMBERS

[76] Inventor: Emile Pfalzgraf, 7, rue de Neuwiller, 67330 Bouxwiller, France

[21] Appl. No.: 731,586

[22] Filed: May 7, 1985

[51] Int. Cl.[4] .......................... B23C 5/26; B23B 31/00
[52] U.S. Cl. ................................ 409/234; 408/239 R; 279/83
[58] Field of Search ................ 409/234; 408/239 R, 408/239 A; 279/1 A, 1 TE, 83, 99

[56] References Cited

U.S. PATENT DOCUMENTS

| 3,304,837 | 2/1967 | Perman | 409/234 |
| 3,586,344 | 6/1971 | Nixon | 279/83 |
| 4,575,292 | 3/1986 | Pape et al. | 408/239 R |

FOREIGN PATENT DOCUMENTS

| 449641 | 4/1943 | Belgium . | |
| 75159 | 12/1952 | Denmark | 279/83 |
| 15248 | 9/1980 | European Pat. Off. | 279/83 |
| 2234389 | 1/1974 | Fed. Rep. of Germany . | |
| 2328176 | 12/1974 | Fed. Rep. of Germany . | |
| 7513937 | 9/1975 | Fed. Rep. of Germany . | |
| 2727838 | 12/1977 | Fed. Rep. of Germany | 408/239 R |
| 2632435 | 1/1978 | Fed. Rep. of Germany . | |
| 3019970 | 12/1981 | Fed. Rep. of Germany . | |
| 3237128 | 4/1984 | Fed. Rep. of Germany | 408/239 R |
| 1595136 | 7/1970 | France . | |
| 537770 | 7/1973 | Switzerland . | |
| 2155823 | 10/1985 | United Kingdom | 279/1 A |

Primary Examiner—Joseph H. McGlynn
Assistant Examiner—Daniel W. Howell
Attorney, Agent, or Firm—Young & Thompson

[57] ABSTRACT

The present invention concerns an apparatus for locking and/or gripping modular attachments of boring heads, boring bars, intermediate members, adapters, tool holders, hydraulic punches, long tongs, or other mechanical members. The apparatus comprises one or several fastening elements (1) disposed at regular intervals over the diameter of the drive shaft (2) at a given distance from the surface of application (3) of the part to be driven or adapter (4) cooperating with the fastening elements (1). The fastening elements (1) are hemispherical headed screws, and seats (5) provided on the part to be driven or adapted (4) having a hemispherical section of greater radius than that of the screws. Driving in rotation of the drive shaft has for effect an auto-gripping of the surface (3) of the part to be driven against the application surface (6) of the drive shaft (2).

5 Claims, 4 Drawing Sheets

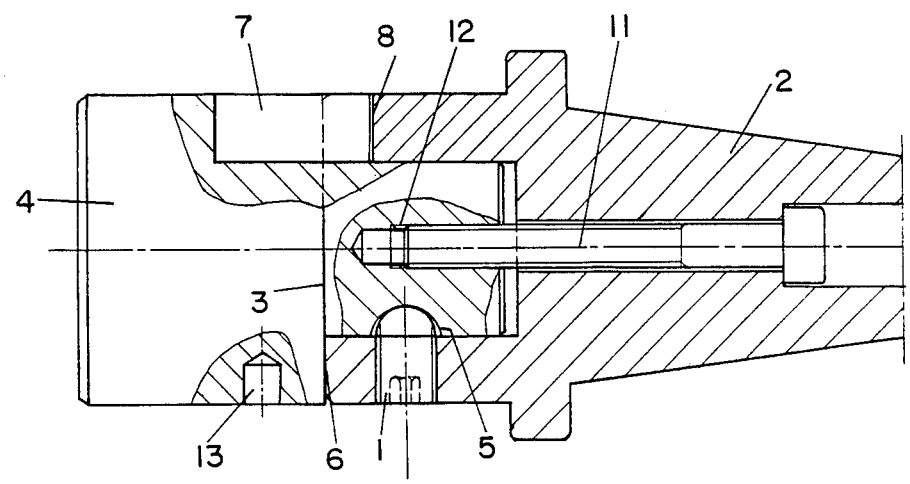
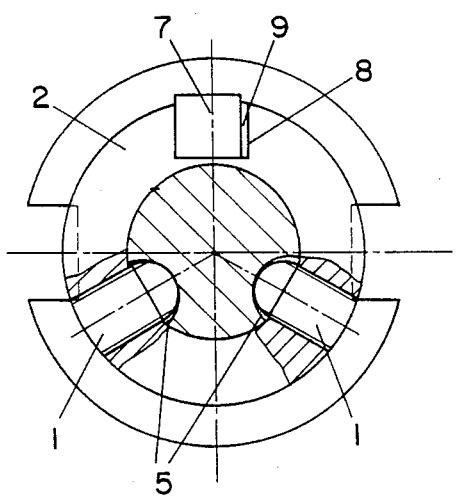
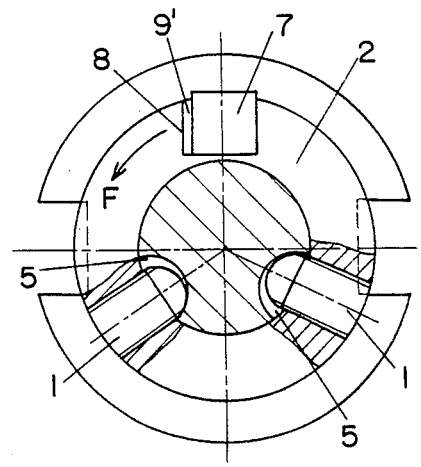

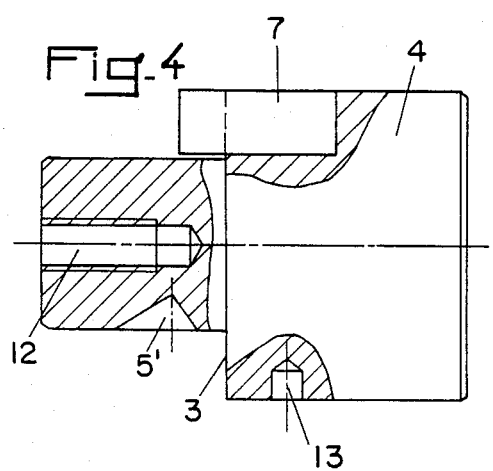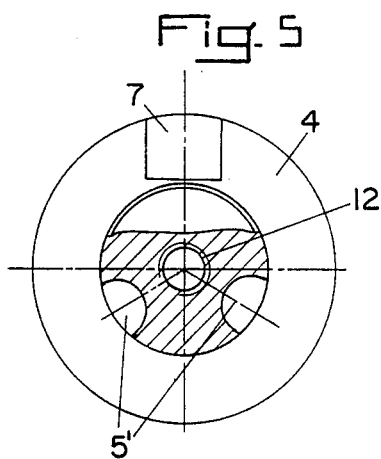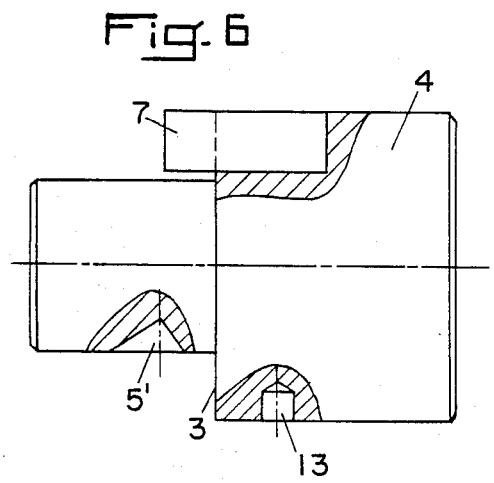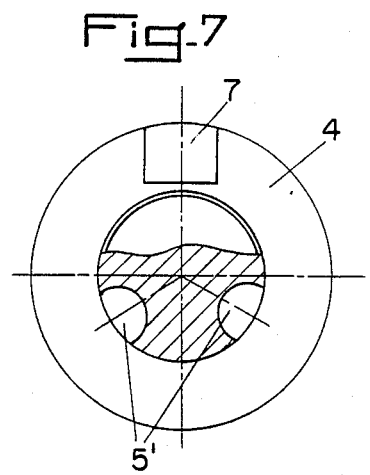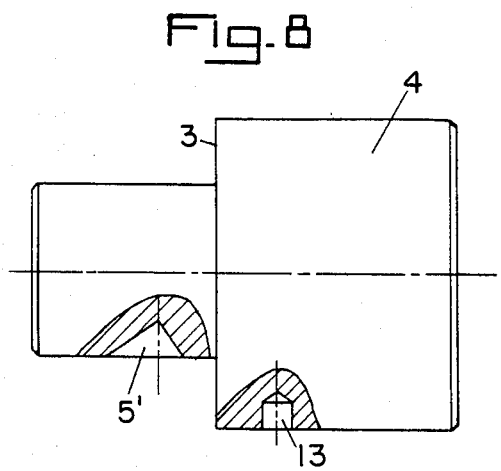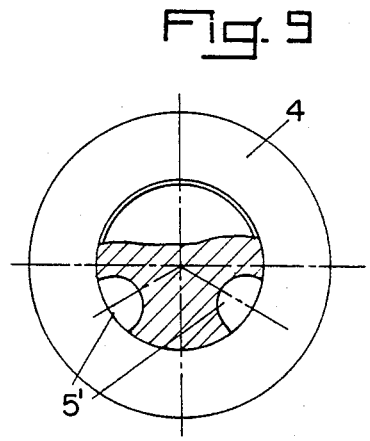

APPARATUS FOR LOCKING AND/OR GRIPPING MODULAR ATTACHMENTS OF BORING HEADS, BORING BARS, INTERMEDIATE MEMBERS, ADAPTERS, TOOL HOLDERS, HYDRAULIC PUNCHES, LONG TONGS, OR OTHER MECHANICAL MEMBERS

The present invention concerns the field of locking and/or gripping modular attachments or boring heads, boring bars, intermediate members, adapters, tool holders, hydraulic punches, long tongs, or otherr mechanical members, and has as its object an apparatus drawn to this effect.

There exist at present various fixating apparatus with screws of the pointed type permitting such a locking or gripping, these screws presenting tip angles ranging from 30° to 90° and being locked in a groove situated on the axis of the screw or displaced with respect to that axis. In addition, there similarly exist apparatus for flat fixation by inclined screws, by pins, or by keying.

However, these known locking and/or gripping apparatus do not generally permit fixation of a very precise type of attachment, a different attachment obligatorily requiring a different apparatus.

Similarly, there exist apparatus of this type, in which a screw of spherical extremity, fixed on the drive shaft at a given distance from the surface of application of the piece to be driven, cooperates with a longitudinal groove of the same section provided on the element to be driven, and extends at an angle with respect to the generator for the said elements. In such an apparatus, the distance from the bottom of the groove to the surface of application of the element to be driven is less than that from the screw to the said surface.

These apparatus do not permit, however, transmission of significant power, because they cannot assure a sufficiently secure gripping surface against surface, particularly in auto-gripping.

The object of the present invention is to overcome these inconveniences.

It has, in effect, as an object an apparatus for locking and/or gripping modular attachments of boring heads, boring bars, intermediate members, adapters, tool holders, hydraulic punches, long tongs, or other mechanical members, characterized in that it comprises one or several fastening elements disposed at regular intervals over the diameter of the drive shaft, mandrel, or driving attachment at a given distance from the surface of application of the element to be driven or the adapter, and one or several seats provided on the element to be driven or the adapter cooperating with the fastening elements, in which the fastening elements are spherical-headed screws, and in whch the seats provided on the element to be driven or fitted present a semi-cylindrical section of greater radius than that of the screws, so that the driving in rotation of the said element has as an effect an auto-gripping of this latter against the surface of application of the drive shaft.

Conforming to a characteristic of the invention, the element to be driven or the adapter is provided with a drive pin designed to cooperate with a seat of the drive shaft having a greater width than that of the pin so as to permit a slight relative rotation between the drive shaft and fitting favoring the auto-gripping.

The invention will be best understood by virtue of the following description, which refers to preferred embodiments, given by way of non-limiting examples, and is explained with reference to the accompanying schematic drawings, in which:

FIG. 1 is a partial view, in side elevation and in section, of an extremity of a shaft, mandrel, or attachment, and of an element to be driven or an adapter provided in the arrangement according to the invention;

FIGS. 2 and 3 are views at the level of the surfaces of application of the extremity of the shaft and of the element to be driven or the adapter, partially in cross-section at the level of the fastening element, respectively in position of assembly and gripping and in position of work and auto-gripping, and FIGS. 4 to 19 represent different embodiments of an adapter, in longitudinal elevation and in frontal elevation, partially in section.

According to the invention, and to teach it more particularly, by way of example, the FIGS. 1 to 3 of the accompanying drawings, the apparatus for locking and/or gripping modular attachments of boring heads, boring bars, intermediate members, adapters, tool holders, hydraulic punches, long tongs, or other mechanical members is characterized in that it comprises fastening elements 1 disposed at regular intervals over the diameter of the shaft, mandrel, or driving attachment 2 at a predetermined distance form the surface of application 3 of the element to be driven or adapter 4, and seats 5 provided on the adapter 4 and cooperating with the fastening elements 1, such that the fastening elements 1 are spherical-headed screws, and in which the seats 5 of the adapter 4 present a semi-cylindrical section of greater radius than that of the screws 1. By virtue of this embodiment, the driving in rotation of the element or adapter 4 has for effect an auto-gripping of its surface 3 against the surface of application 6 of the drive shaft 2. In fact, the axis of the screws 1 being at a greater distance from the surface 6 than that from the axis of the seats 5, a rotation of the shaft 2 with respect to the adapter 4 produces a wedging effect tending to push the spherical head of the screws 1 toward the bottom of the seats 5, and thus, to grip to a greater extent the surfaces 3 and 6 the one against the other, such that an uneven cutting in the course of working is impossible.

The adapter 4 may, in addition, be provided with a drive pin 7 (FIGS. 1 to 7, 10 to 13, and 16–17), which is designed to cooperate with a seat 8 of the drive shaft 2. This seat 8 has a greater width than that of the pin 7, such that a slight relative rotation is possible between the adapter 4 and the shaft 2 favoring the auto-gripping effect of the screws 2 and the seats 5 as shown more particularly in FIGS. 2 and 3. In fact, FIG. 2 shows in frontal elevation the position of the adapter 4 in the shaft 2 during its gripping at the fusion, a slot 9 existing in the seat 8 to the right of the pin 7, and the screws 1 being centered in the seats 5 of the shaft 2. In working operation, the shaft 2 turns in the direction of the arrow F such that the slot 9' is displaced to the left of the pin 7 and the screws 1 are wedged by their heads against the right hand portion of the bottom of the corresponding seats 5 (FIG. 3). In effect, on commencing work operation a slight rotation of the adapter 4 in the shaft 2 displaces the pin 7 in the seat 8 toward the right, and the screws are wedged on one side of their seat, effecting the auto-gripping. The seats of the screws 1 in the adapter 4 are in the form of a pierced opening with a spherical extremity of radius greater than that of the screws 1 (FIGS. 1 to 3 and 10 to 15). This embodiment permits an advantageous auto-gripping effect during use, the screws 1 being gripped in the bottom of the seats 5 upon joining and being displaced toward an interior surface of the seats 5 during use.

According to another characteristic of the invention, and as shown in FIGS. 4 to 9, the adapters 4 are provided with two seats 5' in the form of longitudinal grooves inclined at the section or of semi-cylindrical bottom and advantageously spaced apart 120°. However, it is similarly possible to provide a greater number of seats 5' and screws 1 disposed at different angles.

Figure 16:
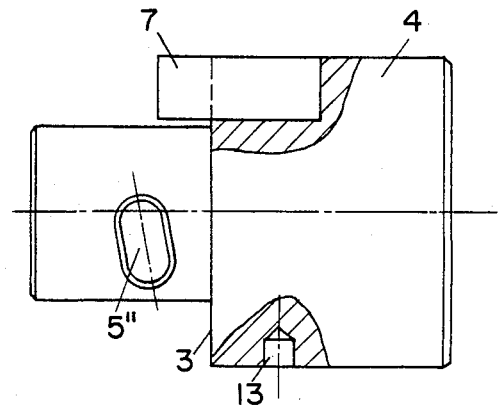
Figure 17:
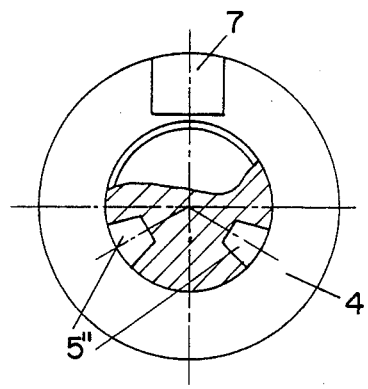
Figure 18:
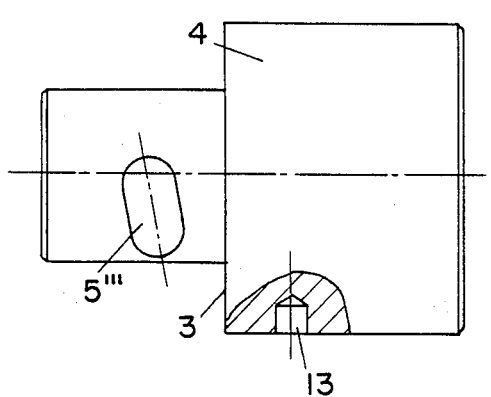
Figure 19:
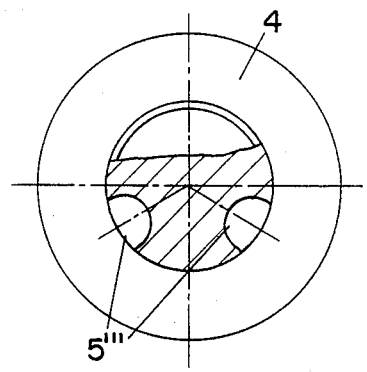

FIGS. 16 and 17 show another embodiment of the seats of the adapter 4, in which each seat 5" is in the form of an oblong opening of trpezoidal cross section inclined with respect to the surface of application 3 of the adapter 4. FIGS. 18 and 19 show another embodiment of the invention, in which each seat 5"" is in the form of an oblong opening inclined with respect to the surface 3 and the adapter 4 and having a right semi-cylindrical section (FIG. 19). In this embodiment, it is equally possible to provide a complementary pin drive.

In these two embodiments, a slight rotation of the adapter 4 in the shafft 2 at the start of operation causes a very important gripping and a strong mutual application between surfaces 3 and 6.

For the realization of linkages of great power transmission capacity, and in the case of use of adapters subject to very great stresses, the apparatus may be additionally provided with a screw 11 cooperating with a screw threading 12 of the adapter 4 for the gripping of this latter.

In order to facilitate its de-gripping, each adapter 4 is provided at its circumference with an opening 13 for its actuation by means of a lug key (FIGS. 4, 6, 8, 10, 12, 14, 16 and 18).

For transmission of relatively low power, the adapters 4 could be provided, as shown in FIGS. 8, 9 and 14, 15 with only two seats 5, without supplementary pin drive.

The fastening of the adapters 4 in the drive shaft 2, or attachment, is always effected by centering of the adapter 4 in the bore of the attachment by disposition of the seats 5 opposite the screws 1. In the case of the presence of a drive pin 7, this latter is applied in its seat 8 against the left-hand surface of this latter (FIG. 2), whereby the screws are gripped.

The difference in width between drive pin 7 and seat 8 may be calculated as a function of the auto-gripping force required for optimum performance. In addition, the drive pin 7 assures equally a limitation of the said auto-gripping in order that the latter does not impede an unlocking by the usual means.

By virtue of the invention, it is possible to realize modular assemblies suitable for use on machining centers and in flexible workshops, and equally suitable for piercing as for milling, screw tapping, or boring. The assemblies so realized permit the transmission of all the available power of the spindle of the machine by virtue of a strong gripping, surface against surface, obtained by auto-gripping at the onset of operation. Additionally, such assemblies are easily accessible for mounting and dismounting as above.

Certainly, the invention is not limited to the embodiments described and shown in the accompanying drawings. Modifications remain possible, notably from the point of view of the construction of the various elements, or by substitution of equivalent techniques, without departing significantly from the scope of the invention.

I claim:

1. In an apparatus for locking and/or gripping modular mechanical members, of the type comprising a rotatable driving member having a central bore extending in the direction of its axis of rotation and a driven member having a tool and a central projection adapted to be received by said bore, said driving and driven members adapted to be interfittable along the axis of the rotation of said driving member such that said driven member is driven in rotation by rotating said driving member; the improvement comprising: at least one fastening element comprising a radially inwardly extending screw having a hemispherical head, said screw being disposed in said driving member, and a hemispherical recess disposed on said central projection of said driven member; said screw and said recess being so dimensioned and disposed that when said driving and driven members are interfitted said hemispherical head of said screw is insertable in said hemispherical recess; said hemispherical recess having a radius greater than the radius of said hemispherical head, to provide relative rotation of said interfitted driving and driven members for urging said hemispherical head against said hemispherical recess, whereby said driven member is urged into tight frictional engagement with said driving member upon rotation of said driving member.

2. Apparatus according to claim 1, and a peripheral projection extending along said axis of rotation, said peripheral projection being disposed on a peripheral portion of one of said driving or driven members; and a housing disposed on the other of said driving or driven members, adapted to receive said peripheral projection when said driving and driven members are in interfitted relation; said housing having a dimension in the direction of rotation of said apparatus greater than the corresponding dimension of said peripheral projection in the direction of rotation of said apparatus, whereby relative rotation of said driving and driven members will jam said peripheral projection against said housing in the direction of rotation of said apparatus, thereby to limit the force with which said hemispherical head is urged against said hemispherical recess.

3. Apparatus according to claim 2, wherein said peripheral projection is disposed on said driving member, and said housing is disposed on said driven member.

4. Apparatus according to claim 2, wherein said at least one fastening element comprises two fastening elements angularly spaced from said peripheral projection and housing at a same angle.

5. Apparatus according to claim 4, wherein said same angle is 120°.

* * * * *